(12) United States Patent
Maupu et al.

(10) Patent No.: US 10,698,729 B2
(45) Date of Patent: Jun. 30, 2020

(54) METHOD FOR ORGANIZING TASKS IN THE NODES OF A COMPUTER CLUSTER, ASSOCIATED TASK ORGANIZER AND CLUSTER

(71) Applicant: BULL SAS, Les Clayes Sous Bois (FR)

(72) Inventors: Yann Maupu, Arpajon (FR); Thomas Cadeau, Massy (FR); Matthieu Daniel, Antony (FR)

(73) Assignee: BULL SAS, Les Clayes Sous Bois (FR)

(*) Notice: Subject to any disclaimer, the term of this patent is extended or adjusted under 35 U.S.C. 154(b) by 104 days.

(21) Appl. No.: 15/539,965

(22) PCT Filed: Dec. 16, 2015

(86) PCT No.: PCT/FR2015/053533
§ 371 (c)(1),
(2) Date: Jun. 26, 2017

(87) PCT Pub. No.: WO2016/102818
PCT Pub. Date: Jun. 30, 2016

(65) Prior Publication Data
US 2018/0004570 A1    Jan. 4, 2018

(30) Foreign Application Priority Data
Dec. 24, 2014   (FR) ..................... 14 63319

(51) Int. Cl.
*G06F 9/48*   (2006.01)
*G06F 9/50*   (2006.01)

(52) U.S. Cl.
CPC .......... *G06F 9/4881* (2013.01); *G06F 9/5027* (2013.01); *G06F 9/5038* (2013.01); *G06F 9/5061* (2013.01); *G06F 9/5072* (2013.01)

(58) Field of Classification Search
CPC .... G06F 9/4881; G06F 9/5027; G06F 9/5038; G06F 9/5061; G06F 9/5072
See application file for complete search history.

(56) References Cited

U.S. PATENT DOCUMENTS

| | | | |
|---|---|---|---|
| 7,707,578 B1 * | 4/2010 | Zedlewski ............ | G06F 9/5027 712/215 |
| 8,176,490 B1 | 5/2012 | Jackson | |

(Continued)

FOREIGN PATENT DOCUMENTS

| | | |
|---|---|---|
| GB | 1452865 A | 10/1976 |
| WO | WO 2013/024818 A1 | 2/2013 |
| WO | WO 2014/143791 A1 | 9/2014 |

OTHER PUBLICATIONS

International Search Report related to Application No. PCT/FR2015/053533 reported on Apr. 28, 2013.

(Continued)

*Primary Examiner* — Sisley N Kim
(74) *Attorney, Agent, or Firm* — Miller, Mathias & Hull LLP (57) ABSTRACT

The invention relates to a method for organizing tasks, in at least some nodes of a computer cluster, comprising: First, launching two containers on each of said nodes, a standard container and a priority container, next, for all or part of said nodes with two containers, at each node, while a priority task does not occur, assigning one or more available resources of the node to the standard container thereof in order to execute a standard task, the priority container thereof not executing any task, when a priority task occurs, dynamically switching only a portion of the resources from the standard container thereof to the priority container thereof, such that, the priority task is executed in the priority container with the switched portion of the resources, and the standard task continues to be executed, without being halted, in the (Continued)

standard container with the non-switched portion of the resources.

18 Claims, 4 Drawing Sheets

(56) References Cited

U.S. PATENT DOCUMENTS

| | | | |
|---|---|---|---|
| 2003/0061260 A1* | 3/2003 | Rajkumar | G06F 9/4887 718/104 |
| 2004/0153708 A1 | 8/2004 | Joshi et al. | |
| 2013/0227560 A1* | 8/2013 | McGrath | G06F 9/45558 718/1 |
| 2014/0237477 A1 | 8/2014 | Cadambi et al. | |
| 2015/0178111 A1* | 6/2015 | Warszawski | G06F 9/45558 718/1 |

OTHER PUBLICATIONS

French Search Report related to Application No. FR 14 63319 reported on Dec. 24, 2014.
Ejarque J et al: "SLA-Driven Semantically-Enhanced Dynamic Resource Allocator for Virtualized Service Providers", ESCIENCE, 2008, ESCIENCE '08. IEEE Fourth International Conference On, IEEE, Piscataway, NJ, USA, Dec. 7, 2008 (Dec. 7, 2008), pp. 8-15, XP031399598, ISBN: 978-1-4244-3380-3 p. 8-p. 11.
J.S. Chase et al: "Dynamic virtual clusters in a grid site manager", High Performance Distributed Computing 2003, Proceedings. 12$^{TH}$ IEEE International Symposium On, Jan. 1, 2003 (Jan. 1, 2003), pp. 90-100, XP055170017, DOI: 10.1109/HPDC.2003.1210019 ISBN: 978-0-78-951965-4 le document en entire.
Shaw Sushadra Bose et al: "A survey on scheduling and load balancing techniques in cloud computing environment", 2014 International Conference on Computer and Communication Technology (ICCCT), IEEE, Sep. 26, 2014 (Sep. 26, 2014), pp. 87-95, XP032715945, DOI: 10.1109/ICCCT.2014.7001474 ISBN: 978-1-4799-6757-5 [extrait le Jan. 5, 2015] le document en entire.
Zhang Qi et al: "Dynamic Heterogeneity-Aware Resource Provisioning in the Cloud", IEEE Transactions on Cloud Computing, IEEE Computer Society, USA, vol. 2, No. 1, Mar. 1, 2014 (Mar. 1, 2014), pp. 14-28, XP011546239, DOI: 10.1109/TCC.2014.2306427 [extrait le Apr. 23, 2014] le document en entire.
Xu Xin et al: "A Novel Resource Scheduling approach in Container Based Clouds", 2014 IEEE 17$^{TH}$ International Conference on Computational Science and Engineering, IEEE, Dec. 19, 2014 (Dec. 19, 2014), pp. 257-264, XP032730270, DOI: 10.1109/SCE.2014.77 [extrait le Jan. 26, 2015] le document en entire.
Li Qing et al: "An Adaptive Resource Sharing Platform for Internet Data Center" 2013 IEEE 10$^{TH}$ International Conference on High Performance Computing and Communications & 2013 IEEE International Conference on Embedded and Ubiquitous Computing, IEEE, Nov. 13, 2013 (Nov. 13, 2013), pp. 1179-1186, XP032606412, DOI: 10.1109/HPCC.AND.EUC.2013.167 [extrait le Jun. 11, 2014] le document en entire.
Wenyu Zhou et al: "VMCTune: A Load Balancing Scheme for Virtual Machine Cluster Resource Allocation", Grid and Cooperative Computing (GCC), 2010 9$^{TH}$ International Conference On, IEEE, Piscataway, NJ, USA, Nov. 1, 2010 (Nov. 1, 2010), pp. 81-86, XP031831026, ISBN: 978-1-4244-9334-0 le document en entier.
M. Holenderski et al: "Parallel-Task Scheduling on Multiple Resources" Department of Mathematics and Computer Science, Technische Universiteit Eindhoven Den Dolech 2, 5600 Az Eindhoven, The Netherlands.

* cited by examiner

METHOD FOR ORGANIZING TASKS IN THE NODES OF A COMPUTER CLUSTER, ASSOCIATED TASK ORGANIZER AND CLUSTER

CROSS-REFERENCE TO RELATED APPLICATION

This Application is a 35 USC § 371 US National Stage filing of International Application No. PCT/FR2015/053533 filed on Dec. 16, 2015, and claims priority under the Paris Convention to French Patent Application No. 14 63319 filed on Dec. 24, 2014.

FIELD OF THE DISCLOSURE

The invention relates to a method for organizing tasks in at least some nodes of a computer cluster, an organizer of tasks to be assigned to the nodes of a computer cluster, and a computer cluster comprising such a task organizer.

BACKGROUND OF THE DISCLOSURE

According to a prior art, halting the execution of a standard task at the node under consideration and assigning resources from the node under consideration to execute a priority task before being able to then resume execution of the standard task is known.

The disadvantage of this prior art is that the standard task has to be fully restarted, and all the processing already performed on this standard task is completely lost, or is at least lost from the last point of synchronization.

Consequently, such processing, even from the last point of synchronization, can easily represent several hours or even several days of processing a high number of nodes of a large computer cluster, which represents a considerable processing mass or computing time, which is irretrievably lost. In addition, some tasks are executed without any point of synchronization.

According to a second prior art, waiting for the end of execution of this standard task, or at least for its next point of synchronization, and then going to the priority task before all the other pending standard tasks in a sequencing queue of these standard tasks is known. No standard task processing that has already been performed is then lost.

But, the priority task must wait for the end of the standard task being executed or at least for its execution up to the next point of synchronization, which may be very long. The corresponding delay of a critical priority task may be very harmful.

SUMMARY OF THE DISCLOSURE

The object of the present invention is to provide a method for organizing tasks in the nodes of a computer cluster at least partially mitigating the aforementioned disadvantages.

More specifically, the invention aims to supply a method for organizing tasks in the nodes of a computer cluster, which method first launches at least two containers, a standard container and a priority container, on one node, and then switches the resources from the standard container to the priority container when a priority task occurs while the node is executing a standard task in the standard container, in order to be able to, on the one hand execute the priority task urgently in the priority container with sufficient resources, and on the other hand continue executing the standard task, even slowly, without having to halt and therefore lose the processing work that has already been done. In fact, a task halted in progress has to be fully restarted, all the work already performed then being lost.

In this manner, the management of the levels of priorities of the task organizer is optimized, and the bandwidth of such a task organizer is increased globally. The flexibility of use of a cluster implementing this task organizing method in the nodes of the cluster is also markedly improved.

For this purpose, the present invention proposes a method for organizing tasks, in at least some nodes of a computer cluster, comprising: First, launching two containers on each of said nodes, a standard container and a priority container, next, for all or part of said nodes with two containers, at each node, while a priority task does not occur, assigning one or more available resources of the node to the standard container thereof in order to execute a standard task, the priority container thereof not executing any task, when a priority task occurs, dynamically switching only a portion of the resources from the standard container thereof to the priority container thereof, such that, the priority task is executed in the priority container with the switched portion of the resources, and the standard task continues to be executed, without being halted, in the standard container with the non-switched portion of the resources.

The available resources of the node are the resources that are not required for the internal operation of the node or for opening the priority container. In the event of no priority task, preferentially the majority, or even most or almost all available resources are assigned to the standard container.

The resources considered comprise at least processor resources, and also preferentially random access memory resources. The resources under consideration may optionally further comprise input/output resources and/or network resources.

Said standard task can continue to be executed, without being halted, until the termination of this standard task or until the next point of synchronization of this standard task, thus preventing the processing already partially performed for this task from being lost. The important thing is to not halt execution of the standard task under conditions where the work already executed for this standard task will be lost, but on the contrary, either to not halt the execution of the standard task at all or to only halt the execution of the standard task under conditions where the work already executed for this standard task can be recovered without losses.

For this purpose, the present invention also proposes a computer cluster comprising: several nodes, an organizer of tasks to be assigned to said nodes, configured, for at least some of said nodes, so as to: First, launch two containers on each of said nodes, a standard container and a priority container, next, for all or part of said nodes with two containers, at each node, while a priority task does not occur, assign resources of the node to the standard container thereof in order to execute a standard task, the priority container thereof not executing any task, when a priority task occurs, dynamically switch only a portion of the resources from the standard container thereof to the priority container thereof, such that, the priority task is executed in the priority container with the switched portion of the resources, and the standard task continues to be executed, without being halted, in the standard container with the non-switched portion of the resources.

For this purpose, the present invention further proposes an organizer of tasks to be assigned to the nodes of a computer cluster, configured, for at least some of said nodes, so as to: First, launch two containers on each of said nodes, a standard container and a priority container, next, for all or part of said nodes with two containers, at each node, while a priority task does not occur, assign resources of the node to the standard container thereof in order to execute a standard task, the priority container thereof not executing any task, when a priority task occurs, dynamically switch only a portion of the resources from the standard container thereof to the priority container thereof, such that, the priority task is executed in the priority container with the switched portion of the resources, and the standard task continues to be executed, without being halted, in the standard container with the non-switched portion of the resources.

Installing several virtual machines on each cluster node should also be contemplated, but managing several virtual machines on the same real node would produce a significant loss of task processing performance at this real node. This loss is significantly higher in the case of managing a second virtual machine than in the case of managing a second container, one order of magnitude higher, for example approximately by a factor of 10 (for example performance losses on the order of 30% instead of performance losses on the order of 3%).

Installing several "chroots" on each cluster node should also be contemplated, but it would then not be possible to dynamically switch resources from one chroot to another chroot, at a node executing a standard task and receiving a priority task while it executes a standard task.

According to preferred embodiments, the invention comprises one or more of the following characteristics that may be used separately or in partial or total combination between each other, with one or the other of the aforementioned objects.

Preferably, while a priority task does not occur, all available resources of the node are assigned to the standard container thereof. Preferably, while a priority task does not occur, at least 90%, preferably at least 95%, of the node resources are assigned to the standard container, and/or less than 5% of the node resources are assigned to the priority container. Thus, in normal mode, i.e., in the absence of a priority task to be performed urgently, cluster performance is similar to the performance it would have if the nodes did not each have two containers.

Preferably, once the priority task has terminated, the resources that had been switched from the standard container to the priority container are switched back from the priority container to the standard container. Thus, once the cluster returns to normal mode, i.e., once the priority task has been executed urgently, cluster performance becomes similar to the performance it would have if the nodes did not each have two containers. Preferably, when a priority task occurs, resources are switched by one or more virtualization control groups in the operating system disposed in the node kernel layer. Thus, the resources assigned to the different standard and priority containers are dimensioned in the host node kernel of the containers, i.e., in the node including the containers.

Preferably, each container has its operating system, enabling it to communicate directly with the host node kernel of these standard and priority containers, independently from the operating system of said host node. Thus, each of the standard and priority containers may behave like a virtual node and may be considered to be a virtual node by the task organizer.

Preferably, said method is carried out by the majority of the nodes of said computer cluster, preferably by all nodes of said computer cluster. Thus, the cluster will be able to manage a priority task requiring a higher processing volume.

Preferably, at least one of the nodes with two containers, preferably several nodes with two containers, more preferably the majority of nodes with two containers, still more preferably all nodes with two containers, is or are computing nodes. It is effectively at the computing node level that the occurrence of a priority task is most probable.

Preferably, each container is a Linux container. In fact, on the one hand the Linux container is completely suitable for being able to be easily and dynamically resized if needed, and on the other hand it disposes a structure that is ready to be handled by the task organizer without notable modification of this task organizer.

Preferably, the resources comprise both processor resources and random access memory resources of the node. These are the most important resources required to be able to execute a priority task urgently. Preferably, the resources also comprise both input/output resources and network resources of the node.

Preferably, all processor and random access memory resources of a same electronic chip of the node or a same socket or random access memory are assigned to the same container, either all to the standard container or all to the priority container. Thus, the sharing of processor resources or memory resources of a same electronic chip between different containers is prevented, which would be more difficult to manage at the host node kernel level. For example, in the case of two processors, one is assigned to the priority container while the other remains assigned to the standard container. For example, in the case of four processors, three are assigned to the priority container while one of the four remains assigned to the standard container.

Preferably, the proportion of resources to be switched from the standard container to the priority container is configurable by the cluster administrator. Thus, the cluster administrator, depending on the frequency and type of priority tasks that are likely to occur, can optimize the proportion of resources to switch to execute the priority task in the required time while slowing down the execution of the standard task as little as possible.

Preferably, when a priority task occurs, at least 50%, preferably at least 75% of the processor resources of the standard container are switched to the priority container. Preferably, when a priority task occurs, at least 50%, preferably at least 75% of the random access memory resources of the standard container are switched to the priority container. As the priority task should generally be performed very quickly, a majority of resources are then assigned to the priority container in which this priority task will be executed.

Other characteristics and advantages of the invention will appear upon reading the following description of a preferred embodiment of the invention, given by way of example with reference to the appended drawings.

DETAILED DESCRIPTION OF THE DISCLOSURE

Figure 1:
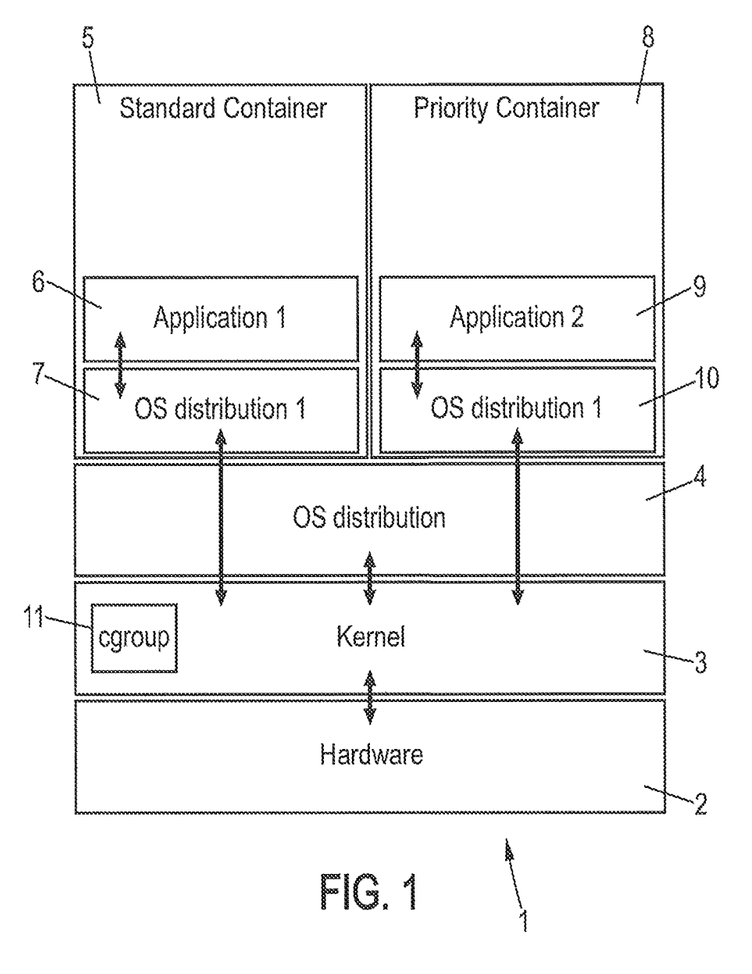
FIG. 1 schematically represents an example of a node on which two containers are launched according to an embodiment of the invention.

FIG. 1 schematically represents an example of a node on which two containers are launched according to an embodiment of the invention.

Node 1 comprises hardware 2, above which is disposed a kernel 3, above which is disposed an operating system distribution 4. Hardware 2 and kernel 3 communicate with each other bidirectionally. Kernel 3 and operating system 4 communicate with each other bidirectionally. Operating system 4 is called host operating system because it is the operating system of the node 1 itself. Kernel 3 comprises a control group ("cgroup") 11. A control group is an element of the kernel whose essential functions are to limit, account for and isolate resource usage (including processor resources, memory resources, input/output resources and network resources) by the different process groups. Memory resources are essentially random access memory resources.

Two containers 5 and 8 are launched on node 1, which is a real node. A container is a form of virtualization of the execution environment (particularly including processor, random access memory, network, file system) where a set of stand-alone processes of the host machine is executed; a container is preferably a Linux (LXC) container. The control group 11 of kernel 3 thus manages the distribution of resources between the two containers 5 and 8. A Linux container combines control groups and namespaces to be able to constitute an isolated environment enabling tasks to be executed independently from both the node itself and the other container or containers of this node.

Container 5, which is a standard container, comprises an application 6 situated above an operating system 7. Application 6 and operating system 7 communicate with each other bidirectionally. Operating system 7 is the operating system of container 5 which is independent from the operating system 4 of node 1 and which communicates bidirectionally directly with kernel 3 of node 1.

Container 8, which is a priority container, comprises an application 9 situated above an operating system 10. Application 9 and operating system 10 communicate with each other bidirectionally. Operating system 10 is the operating system of container 8 which is independent from the operating system 4 of node 1 and which communicates bidirectionally directly with kernel 3 of node 1.

Operating systems 7 and 10 are represented identical to each other and different from operating system 4 in FIG. 1. But these operating systems 4, 7 and 10 can also all be identical to one another or else all be different from one another. Examples of operating systems for containers 5 and 8 are SUSE or REDHAT or UBUNTU.

Figure 2:
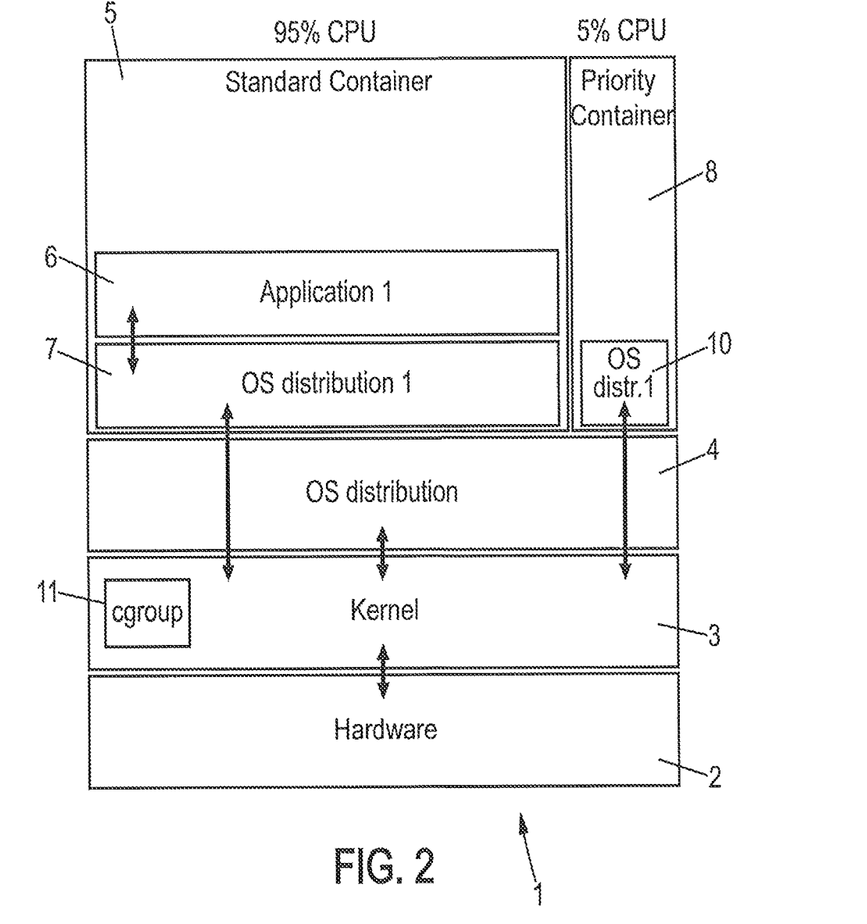
FIG. 2 schematically represents an example of operation of a node on which two containers are launched according to an embodiment of the invention, while a priority task does not occur.

FIG. 2 schematically represents an example of operation of a node on which two containers are launched according to an embodiment of the invention, while a priority task does not occur. The distribution of resources described depends on the distribution for example of processor resources. But the distribution of other resources, particularly random access memory, input/output and network resources is carried out in a similar manner. Different resources can be distributed differently, for example 75%/25% between the two containers for processor resources, with the largest portion assigned to the priority container, and 50%/50% between the two containers for random access memory resources.

FIG. 2 corresponds to the normal execution of a standard task at standard container 5. Thus, while a priority task does not occur, the processor resources available in node 1 are assigned to the standard container 5 thereof to execute a standard task, the priority container 8 thereof not executing a task. A small portion of processor resources still remains assigned to priority container 8 to be able to open the container and leave it on standby, this small portion most often remaining less than 5% of the processor resources of node 1, and advantageously ranging between 2% and 3% of the processor resources of node 1. The absence of a case application 9 shows that the priority container 8 is not executing a task. A large portion of processor resources is then assigned to standard container 5, which executes a standard task, this large portion most often remaining over 95% of the processor resources of node 1, and advantageously ranging between 97% and 98% of the processor resources of node 1. This distribution of processor resources in favor of standard container 5 which executes a standard task to the disadvantage of priority container 8 which is not executing a task was carried out by control group 11 of kernel 3.

Figure 3:
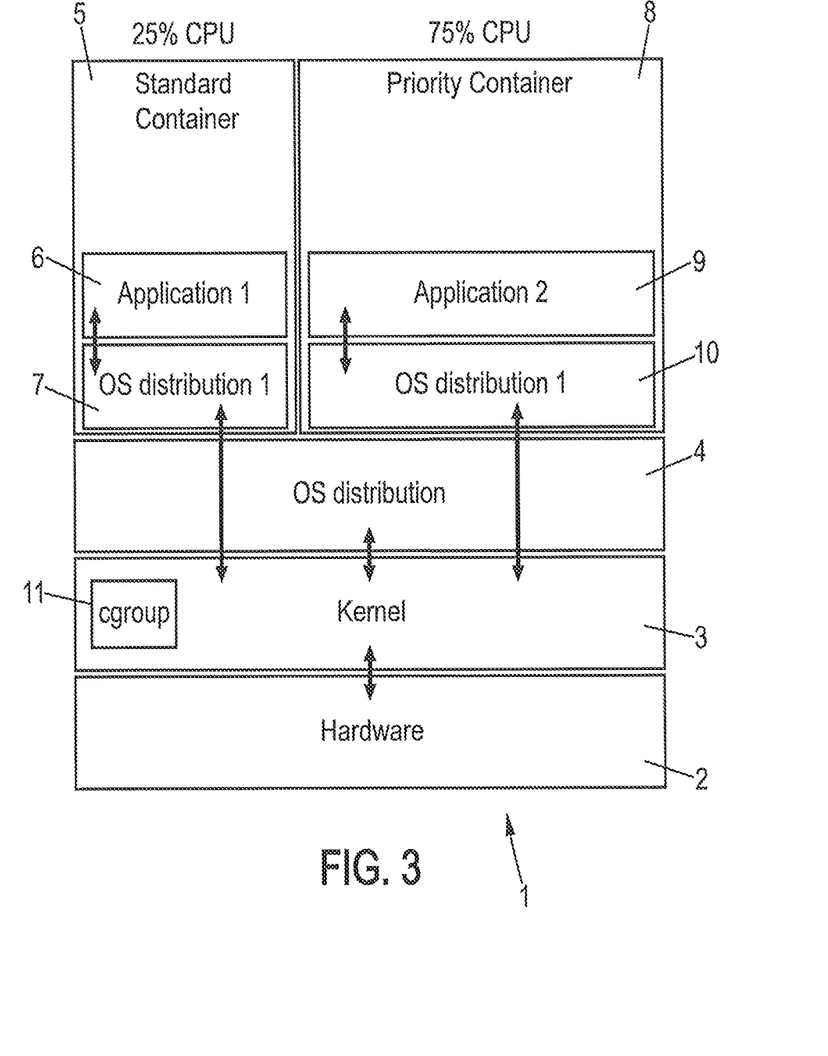
FIG. 3 schematically represents an example of operation of a node on which two containers have been launched according to an embodiment of the invention, while a priority task occurs.

FIG. 3 schematically represents an example of operation of a node on which two containers have been launched according to an embodiment of the invention, while a priority task occurs. A priority task is provided by the batch scheduler, not shown in the figure, which manages the queue of tasks awaiting execution at the nodes in general and at node 1 in particular.

When a priority task occurs, control group 11 of kernel 3 dynamically switches only one portion of the processor resources from the standard container 5 thereof to the priority container 8 thereof, such that, on the one hand the priority task is executed in priority container 8 with the switched portion of the processor resources, and on the other hand the standard task continues to be executed, without being halted, in standard container 5 with the non-switched portion of the processor resources.

Between FIGS. 2 and 3, one sees that 70% of the processor resources of node 1 have been switched from standard container 5 to priority container 8. Thus, in this priority mode represented in FIG. 3, priority container 8 can quickly and effectively perform its priority task with 75% of the processor resources of node 1, while standard container 5 continues to execute its standard task slowly with only 25% of the processor resources of node 1 instead of the 95% it had in the normal mode represented in FIG. 2.

Once the priority task has terminated in priority container 8, the resources switched from standard container 5 to priority container 8 are reswitched from priority container 8 to standard container 5, again culminating in the normal mode configuration represented in FIG. 2, enabling the standard container to continue to execute its standard task with 95% of the processor resources, until it is terminated or until a new priority task arrives at node 1.

The simultaneous or concomitant arrival of two priority tasks at a node on which a standard task is already being executed is very rare. To manage this case, it is possible to open not two but three or more containers. However, most of the time opening many inactive containers unnecessarily uses resources and causes the overall performance of the node to drop. Consequently, preferentially only two containers are launched on a same node, and not more. The second priority task must then be put on hold until the end of the first priority task. A priority task generally takes less time, and even much less time than a standard task, at equal node resource utilization.

Figure 4:
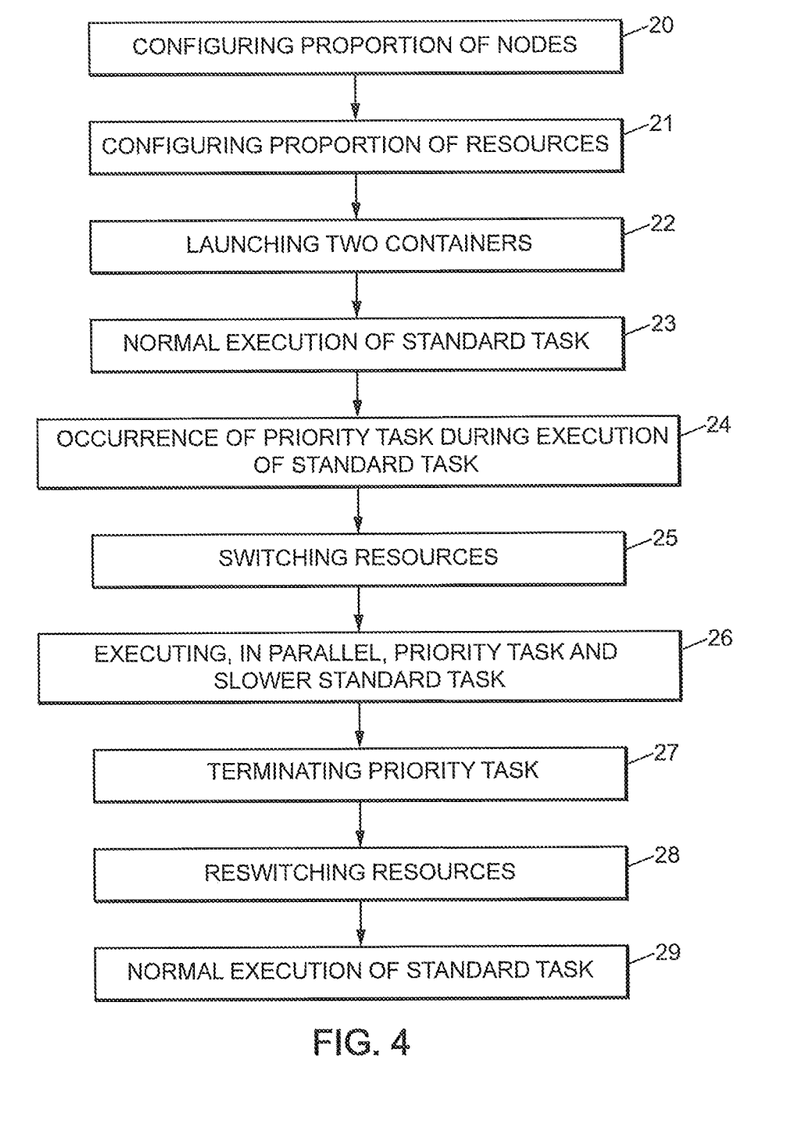
FIG. 4 schematically represents an example of the sequence of steps of the method for organizing tasks according to an embodiment of the invention.

FIG. 4 schematically represents an example of the sequence of steps of the method for organizing tasks according to an embodiment of the invention.

The task organizing method successively proceeds with a step 20 of configuring the proportion of relevant nodes, a step 21 of configuring the proportion of resources, a step 22 of launching two containers, a step 23 of the normal execution of a standard task, the occurrence 24 of a priority task during the execution of the standard task, a step 25 of switching resources, a step 26 of executing the priority task and the slower standard task in parallel, the termination 27 of the execution of the priority task, a step 28 of reswitching resources, and a step 29 of the normal execution of the standard task.

In step 20 of configuring the proportion of relevant nodes by the simultaneous launching of two containers, the cluster administrator decides on the number and type of nodes on which two containers will be simultaneously launched, a standard container for executing standard tasks and a priority container for executing priority tasks. The cluster task organizer will actually see, at the node, two virtual nodes constituted by two standard and priority containers of the node. The other nodes will operate conventionally and each will be seen by the task organizer as a real node.

In step 21 of configuring the proportion of resources, on each node, for each resource type, particularly processor resources and random access memory resources and input/output resources and network resources, the distribution of resources between the standard container and the priority container will be configured, in the event of the occurrence of a priority task, most resources remain assigned to the standard container while such a priority task does not occur. For example, when a priority task occurs, the control group redimensions the containers such that the priority container starts to have approximately 75% processor resources, 50% random access memory resources, 25% input/output resources and 50% network resources, while the standard container will keep approximately 25% processor resources, 50% random access memory resources, 75% input/output resources and 50% network resources. Preferentially, the distribution of resources between a standard container and a priority container is identical or similar for all relevant nodes, but it can be different by node groups or can even vary from one node to another. Optionally, it is possible that one of the resource types, for example network resources, is not expected to be switched at all from the standard container to the priority container, when a priority task occurs, if the type of priority tasks likely to occur never requires this resource type.

In step 22 of launching two containers, the two containers, a standard container and a priority container, are launched on each of the relevant nodes of the cluster.

In step 23 of the normal execution of a standard task, the standard container, having at least 95% of the available resources, less than 5% being assigned to the priority container not executing a task, normally proceeds with the execution of a standard task, therefore at normal speed.

During the occurrence 24 of a priority task during the execution of the standard task, the control group prepares to switch the resources provided in step 21 of configuring the proportion of resources.

In step 25 of switching resources, the assignment of resources between two containers is readjusted in favor of the priority container, which takes a notable portion or even preferentially the majority of resources previously assigned to the standard container, while leaving sufficient resources in the standard container to be able to continue to carry out the standard task, even in a slower mode, so that all of the work already performed for the standard task by the standard container is not lost, but is, on the contrary, retained.

In step 26 of executing the priority task and the slower standard task in parallel, on the one hand the priority task is executed in the priority container with the switched resources, and on the other hand the standard task continues to be executed in the standard container with reduced resources, i.e., non-switched resources, in a slow mode.

During termination 27 of the execution of the priority task, the control group prepares to reswitch, from the priority container to the standard container, the resources that were previously switched, from the standard container to the priority container.

In step 28 of reswitching resources, the priority container only keeps less than 5% of the available resources to remain open and remain ready to execute a future priority task, while the standard container takes over more than 95% of the available resources to continue to execute the standard task that it had never halted, but this time at normal speed and no longer at the slower speed as in step 26 of executing tasks in parallel.

In step 29 of the normal execution of the standard task, the standard task is executed in the standard container with most or even almost all of the node resources, as in step 23, until the arrival of a new priority task that causes the process to resume at the occurrence 24 of the priority task previously described.

Of course, the present invention is not limited to the examples and embodiment described and represented, but is suitable for many variations accessible to the person skilled in the art.

The invention claimed is:

1. A method for sequencing tasks in a plurality of nodes of a computer cluster, the method comprising:
   launching, on each of said nodes, a standard container and a priority container,
   assigning, on each of said nodes, while a priority task does not occur, available resources of the node to the standard container to execute a standard task,
   dynamically switching, when a priority task occurs on one of said nodes, a portion of the resources from the standard container to the priority container, such that, the priority task is executed in the priority container with the switched portion of the resources, and the standard task continues to be executed in standard container with the non-switched portion of the resources, wherein when the standard container and the priority container have an equal percentage of the available resources, the priority task is completed quicker than the standard task.

2. The method of sequencing tasks according to claim 1, wherein, while a priority task does not occur, all available resources of the node are assigned to the standard container thereof.

3. The method of sequencing tasks according to claim 1, wherein, while the priority task does not occur, at least 95% of the node resources are assigned to the standard container, and/or less than 5% of the node resources are assigned to the priority container.

4. The method of sequencing tasks according to claim 1, wherein, once the priority task has terminated, the resources that had been switched from the standard container to the priority container are reswitched from the priority container to the standard container.

5. The method of sequencing tasks according to claim 1, wherein, when a priority task occurs, the switching of resources is carried out by one or more virtualization control groups at the operating system level disposed in the kernel layer of the node.

6. The method of sequencing tasks according to claim 1, wherein each container of each node has its own operating system enabling it to communicate directly with the kernel of the node independently from the operating system of said hest node.

7. The method of sequencing tasks according to claim 1, wherein said method is carried out at more than 50% of nodes of said computer cluster.

8. The method of sequencing tasks according to claim 1, wherein at least one of the plurality of nodes is a computing node.

9. The method of sequencing tasks according to claim 1, wherein each container is a Linux container.

10. The method of sequencing tasks according to claim 1, wherein the resources comprise both processor resources and random access memory resources of the node.

11. The method of sequencing tasks according to claim 10, wherein all processor and random access memory resources of a same electronic chip of the node or a same socket or random access memory are assigned to the same container, either all to the standard container or all to the priority container.

12. The method of sequencing tasks according to claim 1, wherein the resources also comprise input/output resources and network resources of the node.

13. The method of sequencing tasks according to claim 1, wherein the proportion of resources to switch from the standard container to the priority container is configurable by an administrator of the computer cluster.

14. The method of sequencing tasks according to claim 1, wherein, when the priority task occurs, at least 50% of the processor resources of the standard container are switched to the priority container, and/or, when a priority task occurs, at least 50% of the random access memory resources of the standard container are switched to the priority container.

15. The method of sequencing tasks according to claim 1, wherein the standard task is executed with a point of synchronization.

16. The method of sequencing tasks according to claim 1, wherein while the priority task does not occur, at least 90% of the node resources are assigned to the standard container, and less than 5% of the node resources are assigned to the priority container.

17. A computer cluster comprising:
several nodes,
an organizer of tasks to be assigned to said nodes, configured, for at least some of said nodes, so as to:
first, launch two containers on each of said nodes, a standard container and a priority container,
next, for all or part of said nodes, with two containers, at each node,
while a priority task does not occur, assign the resources of the node to the standard container thereof to execute a standard task, the priority container thereof not executing a task,
when a priority task occurs, dynamically switch only a portion of resources from the standard container thereof to the priority container thereof, such that, on the one hand the priority task is executed in priority container with the switched portion of the resources, and on the other hand the standard task continues to be executed, without being halted, in standard container with the non-switched portion of the resources, wherein when the standard container and the priority container have an equal percentage of the available resources, the priority task is completed quicker than the standard task.

18. A computer cluster comprising:
a plurality of nodes, and
an organizer of tasks to be assigned to the plurality of nodes of the computer cluster, wherein the organizer is configured to:
launch, on each of said nodes, a standard container and a priority container,
assign, on each of said nodes, while a priority task does not occur, available resources of the node to the standard container to execute a standard task,
dynamically switch, when a priority task occurs on one of said nodes, a portion of the resources from the standard container to the priority container, such that, the priority task is executed in the priority container with the switched portion of the resources, and the standard task continues to be executed in standard container with the non-switched portion of the resources, wherein when the standard container and the priority container have an equal percentage of the available resources, the priority task is completed quicker than the standard task.

* * * * *